C. E. Sorensen
L. C. Miller
INVENTORS

Patented June 7, 1949

2,472,317

UNITED STATES PATENT OFFICE 2,472,317

METHOD OF AIRCRAFT FUSELAGE CONSTRUCTION

Charles E. Sorensen, Detroit, and Logan C. Miller, Ann Arbor, Mich., assignors to Ford Motor Company, Dearborn, Mich., a corporation of Delaware Application May 17, 1943, Serial No. 487,278

1 Claim. (Cl. 29—286)

This invention relates to airframe construction; and, more particularly, to a method and apparatus particularly advantageous in the construction and assembly of fuselage components.

The object of this invention is to devise a method for fabricating airframe subcomponents and for assembling the subcomponents into an airframe structure. Another object is to devise a method, particularly applicable to fuselage, or similarly enclosed structures, by means of which the finished components may be built up of subcomponents. As a corollary to the latter object, the method contemplates the use of means to support the subcomponents, without additional structural reinforcing, through the subassembly stages, and maintaining them in a predetermined relationship, shape and dimension through the final assembly stage. Another object of the invention is to devise a method by means of which subcomponents are available for successive assembly rather than requiring a final assembly based upon the simultaneous bringing together of all of the subcomponents.

The principal advantages of the present method, as applied to fuselages, is that in the interest of lightness, the structural strength of the fuselage is proportioned to meet only the strains imposed upon the fuselage in actual operation. As a matter of fact, when the fuselage is broken down into subcomponents much of the rigidity which is found in the fuselage as a whole, because of its tubular, monocoque or semistressed skin construction, is wanting and the subcomponents, as such, are not sufficiently strong to maintain their shape during fabrication and final assembly and hence are liable to be warped or distorted. This, of course, prevents the subcomponents from being truly interexchangeable and necessarily delays any assembly steps based upon the premise that the parts to be assembled are duplicates. Therefore, it has been necessary in the past where it was desired to make use of a subcomponent system to provide additional structural strengthening means for the subcomponents; and while these served the purpose during the fabricating and assembly steps, they were useless when the final fuselage was completed and therefore represented only so much unnecessary weight. Also, because of the generally tubular conformation of the fuselage section, it was necessary to bring all the subcomponents together at once to complete the tubular form in the final assembly operation. This was permissible when the fuselage was made, as in many instances, in halves which were merely joined together for the final operation. However, when as in the case of larger fuselages they are split in thirds or quarters longitudinally, a very difficult and unduly complicated procedure is necessary to bring all three or four pieces together in one operation. The present operation permits the step-by-step assembly of subcomponents and yet assures that throughout the operation, a proper alignment is maintained and proper mating effected.

In essence, the method comprises the use of supporting and positioning means applied to the various fuselage subcomponents and remaining integral parts thereof from the initial forming of said subcomponents until the completion of the final assembly step. In the process reinforcing bars of rigid section are developed which are secured to the subcomponents in the various fixtures used in the fabrication of the subcomponents, and remain in position, co-operating with successive fixtures, throughout the various fabricating and assembling steps. As such, they serve the dual purposes of locating and reinforcing the subcomponent structure, and of securing and locating the combined subassemblies through successive assembly steps. They may then be removed from the completed structure without damage thereto and, of course, adds no weight whatever to the completed ship.

With these and other objects in view, the invention consists in the arrangement, construction and combination of the various parts of the improved device, as described in the specification, claimed in the claims and illustrated in the accompanying drawings in which:

Fig. 5 is a perspective view on an enlarged scale of the fabrication fixture clamping means.

Figure 1:
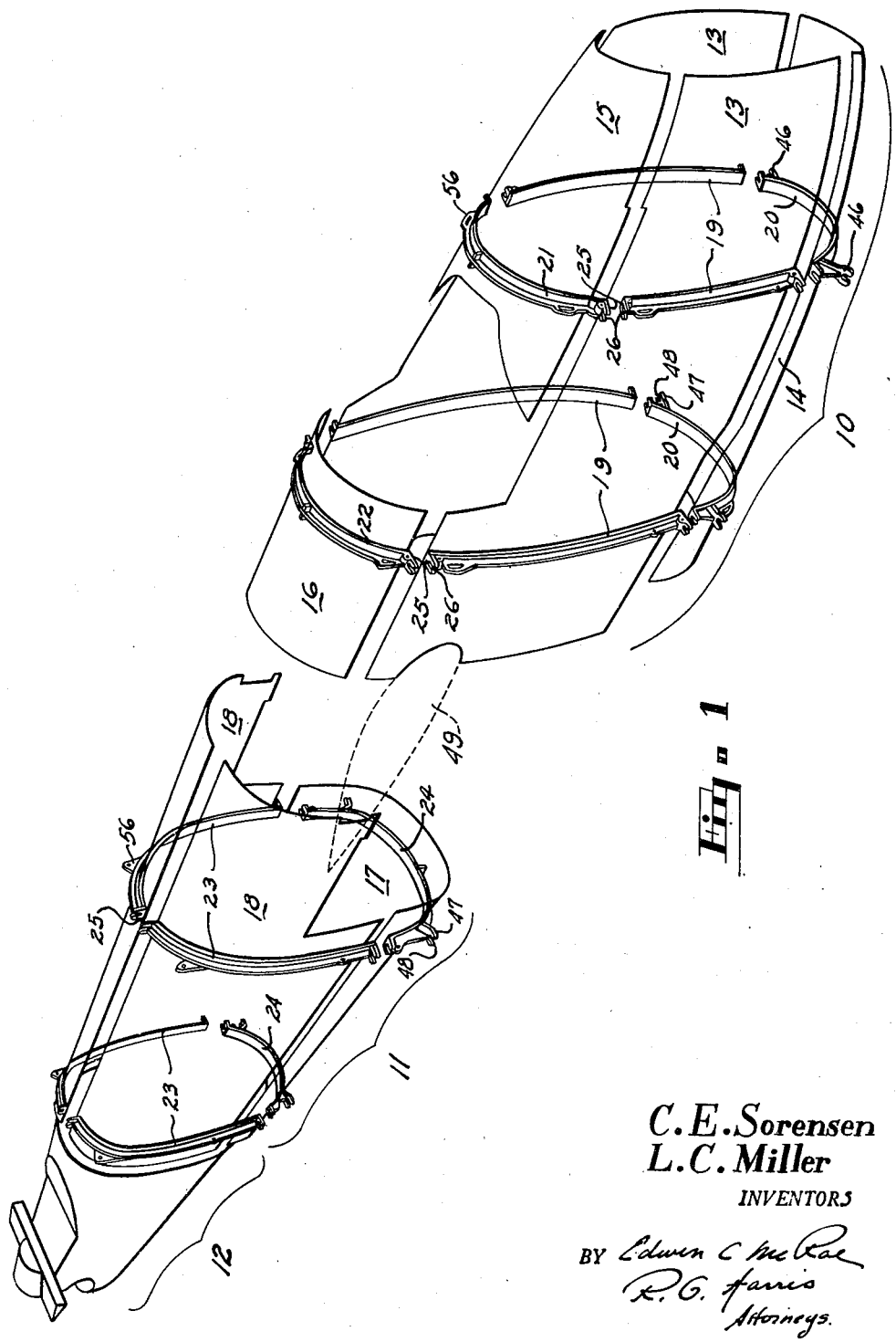
Fig. 1 is a phantom breakdown of a typical large airframe fuselage showing components and subcomponents.

Referring to Fig. 1, a typical, large aircraft fuselage is shown in a phantom view. This comprises as principal components the front fuselage 10, rear fuselage 11 and tail cone 12. The two former components are divided into a number of subcomponents; namely, five in the case of the front fuselage and three in rear fuselage. The front fuselage subcomponents include the two side panels 13, the bottom panel 14, the upper front deck 15 and a canopy 16. The rear fuselage subcomponents include a bottom panel 17 and the two side panels 18. The tail cone, as such, is generally constructed in one piece by other methods since its size is small as compared to the two major components.

Each of the enumerated subcomponents has at least one strap secured to it. Thus in the front fuselage there are the side panel straps 19, the bottom panel straps 20, the deck strap 21 and the canopy strap 22. Similarly, in the rear fuselage are the side panel straps 23 and the bottom panel straps 24. These straps are rigidly secured in a predetermined location to their respective panels and at each end thereof have mating surfaces 25 and a bolt slot 26 by means of which adjacent straps may be brought together in a predetermined relationship and secured and lifting eyes 56 to which conveyor hooks or cables may be attached. When so brought together, four major support rings encompassing the whole perimeter of the fuselage are formed. From this brief description it is believed that the primary purpose of these rings is clear and also the manner in which they function to support the individual subcomponents, relate these subcomponents to adjacent subcomponents and secure all subcomponents in any desired stage during assembly operations up to and including final mating of completed components to an adjacent component. As indicative of the relative location of the various components in the assembled aircraft, the typical wing section 49 is shown in dotted outline.

Figure 2:
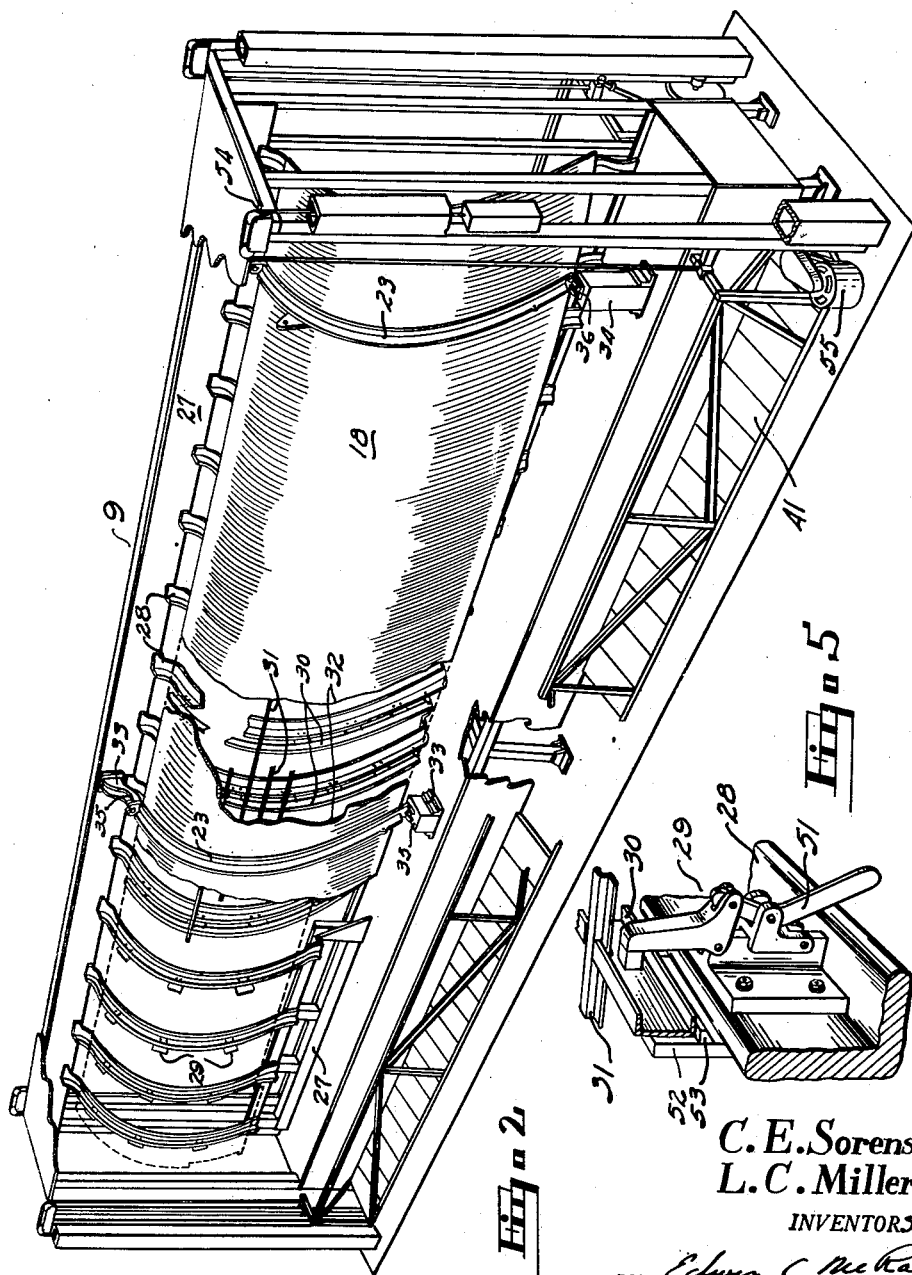
Fig. 2 is a perspective view of a fabrication fixture showing one typical subcomponent in the process of fabrication.
Figure 4:
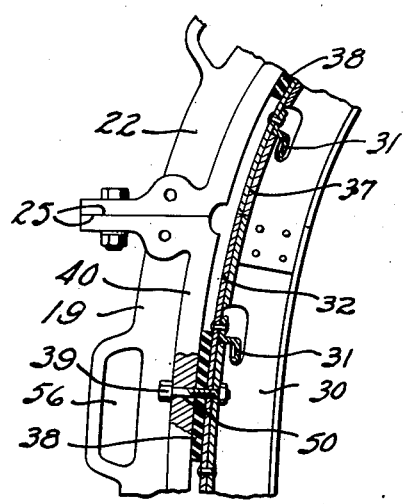
Fig. 4 is a detail in elevation showing the strap locating and supporting means and methods of attachment.

Fig. 2 illustrates a typical first step in construction; namely, the fabrication of one of the side panels 18 of the rear fuselage 11. This is done on the fixture 9 which comprises a frame 27 upon which are mounted a number of transverse supports 28 conforming in location and curvature to the ultimate location and curvature of the ribs 30 of the panel section. Secured to these transverse supports 28 are positioning and clamping means 29 (shown in detail in Fig. 5) and the preformed ribs 30 are brought into alignment and engagement with the supports 28 and the clamping means 29 and are secured in a predetermined arrangement with each other conforming to that desired in the final panel structure. The longitudinal stringers 31 are then engaged in preformed notches in the ribs 30 (as will be more clearly seen in Fig. 4) and secured to the respective ribs. The skin 32 which has been preformed and cut precisely to the outer dimension required is then applied against the stringers 31 and riveted in place. This completes the fabrication of the structural portion of the panel. It is readily apparent, from comparison of size of the ribs and stringers used, that the panel, per se, is wanting in rigidity; and if it were removed from the fixture in its present condition, it would certainly warp or be distorted so that it would be difficult to align it with the remaining subcomponents with which it is to be assembled. The ultimate strength of the fuselage is developed largely because of its tubular construction, and it is only to be expected that the longitudinal segments of the tube are largely lacking in the rigidity which the completed structure will have.

The fixture 9 includes as essential parts two pairs of locating blocks which are permanently secured to the fixture and fixed with respect to the location of the transverse supports 28. One pair of these blocks is shown in 33 and the other at 34 and each block has a mating surface 35 and a bolt 36. These are accurately arranged so that they will receive the side panel straps 23 which are secured thereto by the bolt 36 and thus are established in predetermined position with respect to the fabricated subcomponent before it has been removed from the fixture. When established in this position, holes are drilled through the skin 32 and the flange 37 of the rib 30 corresponding to the hole 50 in the flange 40 of the strap 23, see Fig. 4, and a block of moderately resilient material 38 is slipped between the opposing surfaces of strap and skin. The relationship of the strap to the component is so established as to leave a slight space (as for example, about a quarter of an inch) between the opposing surfaces. A bolt 39 is then inserted through the strap flange 40, the block 38, skin 32 and rib flange 37 securing the strap resiliently yet accurately to the subcomponent. It is thus clear that the strap position is exactly determined not only with respect to the curvature and conformation of the subcomponent itself, but its mating surfaces, due to their being established with respect to predetermined mating surfaces 35 on the locating blocks 33 and 34, have also been located with a high degree of accuracy. Since the position of the blocks 33 and 34 corresponds relatively to that of straps to be located on adjoining subcomponents, a basis of assembly between subcomponents is established.

The detailed construction of the clamping means 29 is shown in Fig. 5 and includes a toggle clamp 51 secured to the transverse support 28 to which is also attached a backing plate 52 and the index ledge 53 by means of which the rib 30 is located and locked in place. For ease of access, the fixture includes an elevator platform 41 counterweighted at 54 and equipped with a motor drive 55.

Figure 3:
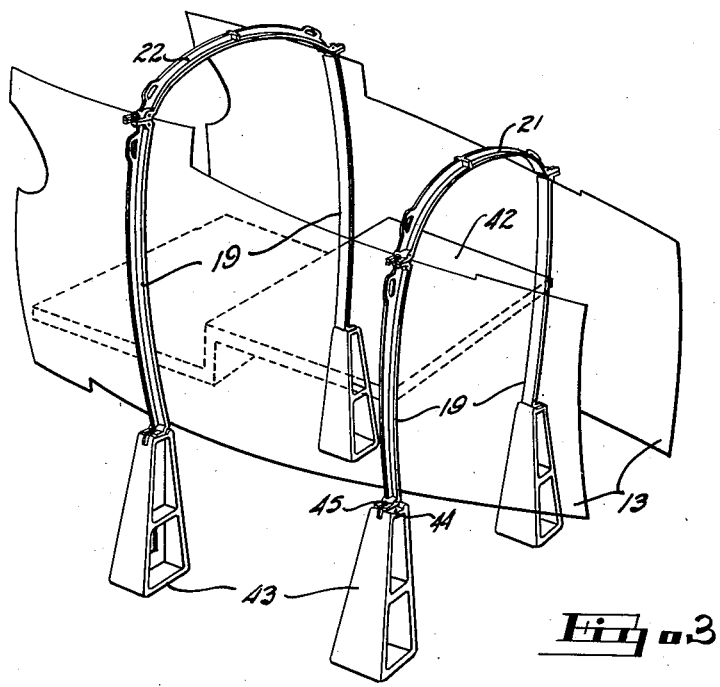
Fig. 3 is a perspective view of an intermediate assembly operation fixture showing the subcombination of several subcomponents of a typical airframe assembly.

Precisely the same operations are performed, on a smaller or greater scale, depending upon the extent of the particular subcomponent involved, in fabricating each of others. Thus, each subcomponent has secured to it at least one locating strap—in most cases two—which occupy a predetermined exact position and which have sufficient rigidity so that they support the particular subcomponent against the stresses to which it is subjected in handling prior to its complete assembly with the other subcomponents. This will readily suggest the utility of this device in such an operation as is shown in Fig. 3, in which two side panels 13 of front fuselage are preassembled with respect to a pilot's floor 42. This may be done by providing a number of pedestals 43 in predetermined location having mating surfaces 44 and securing bolts 45. These are permanently fixed to a position which will conform to that required to have the lower edges of the side panels joined precisely with the abutting edges of the bottom panel when assembled thereto. Similarly, the canopy strap 22 and deck strap 21, although neither deck or canopy panels are attached to them, may be joined to the upper ends of the side panel straps 19. Inasmuch as there are duplicate straps for each location, all of which are exactly the same, it will be seen that the use of the strap assures that the upper edges of the side panel are in precisely the proper position for later assembly to the canopy and deck proper. At the same time free access is permitted both beneath and above the pilot's floor which was not possible when, as in the past, it was necessary in order to complete the assembly to bring all the subcomponents involved together at once. Here accuracy is maintained although less than half of the subcomponents which will go to make up the completed component are mated. Of course, after the setup in Fig. 3 is completed, it is apparent that the canopy and deck straps shown may be removed and other similar straps having the canopy and deck attached lowered in their place and secured on the mating surfaces of the side straps and the subcomponents secured in place. Similarly, a bottom panel 14 having its bottom straps 20 attached may be supported in the suitable cradle elsewhere and then the entire nose fuselage section, comprising the side panels and the deck and canopy panels, lowered into position on it, the mating surfaces 25 of the bottom straps and lower ends of the side straps when coinciding and secured together assuring that the proper interdependence of all parts has been obtained.

Nor is the utility of this device limited to the assembly of the subcomponents as such. Reference is made to abandoned application No. 463,268 in which it is shown how these rings, maintained in position and secured together around the completed component, are available to position the components with respect to other components to which it is to be mated. Thus, referring to Fig. 1 it will be noted that the bottom panel straps 20 and 24 of the front and rear fuselage have auxiliary steps 46 with the customary mating surface 47 and bolt slot 48. When the individual straps are completely secured together to form a continuous ring, the auxiliary steps are available together with other external locating means to position one component as a whole in relationship to another component to which it is to be affixed.

Some changes may be made in the arrangement, construction and combination of the various parts of the improved device in said improved method without departing from the spirit of the invention and it is the intention to cover by the claims such changes as may reasonably be included within the scope thereof.

The invention claimed is:

The method of assembling an airplane fuselage from a plurality of subcomponent parts comprising assembling the individual subcomponents on individual jigs, securing said subcomponents to a rigid supporting member while still supported in the jig, the rigid supporting member comprising a segmental structure conforming internally substantially to the exterior of the subcomponents at a selected vertical section and being provided at the ends with mating surfaces, removing the subcomponent and supporting member from the jig, bringing together in predetermined order a plurality of these subcomponents and supporting members and also at least one supporting member without the corresponding subcomponents so that the mating surfaces of the supporting members are in abutting relationship and the supporting members become in effect a segment of a complete ring without barring free access to the interior of the fuselage past the supporting member which is devoid of subcomponents, securing these supporting members at their end in abutting relationship, permanently securing the subcomponents together, removing the supporting members which carry no subcomponents, replacing such supporting members with supporting members carrying subcomponents, permanently securing the newly added subcomponents to the previously added subcomponents to form a section of the fuselage and removing all the supporting members.

CHARLES E. SORENSEN.
LOGAN C. MILLER.

REFERENCES CITED

The following references are of record in the file of this patent:

UNITED STATES PATENTS

| Number | Name | Date |
|---|---|---|
| 212,983 | Riter | Mar. 4, 1879 |
| 1,199,095 | Meister | Sept. 26, 1916 |
| 1,361,835 | Delage | Dec. 14, 1920 |
| 1,363,433 | Phipps | Dec. 28, 1920 |
| 1,559,807 | Thaden | Nov. 3, 1925 |
| 1,687,877 | Ford | Oct. 16, 1928 |
| 1,694,475 | Ledwinka | Dec. 11, 1928 |
| 1,893,456 | Sykes | Jan. 3, 1933 |
| 1,952,217 | Patton et al. | Mar. 27, 1934 |
| 1,966,933 | Ragsdale | July 17, 1934 |
| 2,087,626 | Minshall | July 20, 1937 |
| 2,212,379 | Bird et al. | Sept. 3, 1940 |
| 2,301,636 | Nicol | Nov. 10, 1942 |
| 2,314,319 | Smith | Mar. 16, 1943 |
| 2,358,022 | Mullen | Sept. 12, 1944 |
| 2,378,043 | Sorensen | June 12, 1945 |